Figure 1:
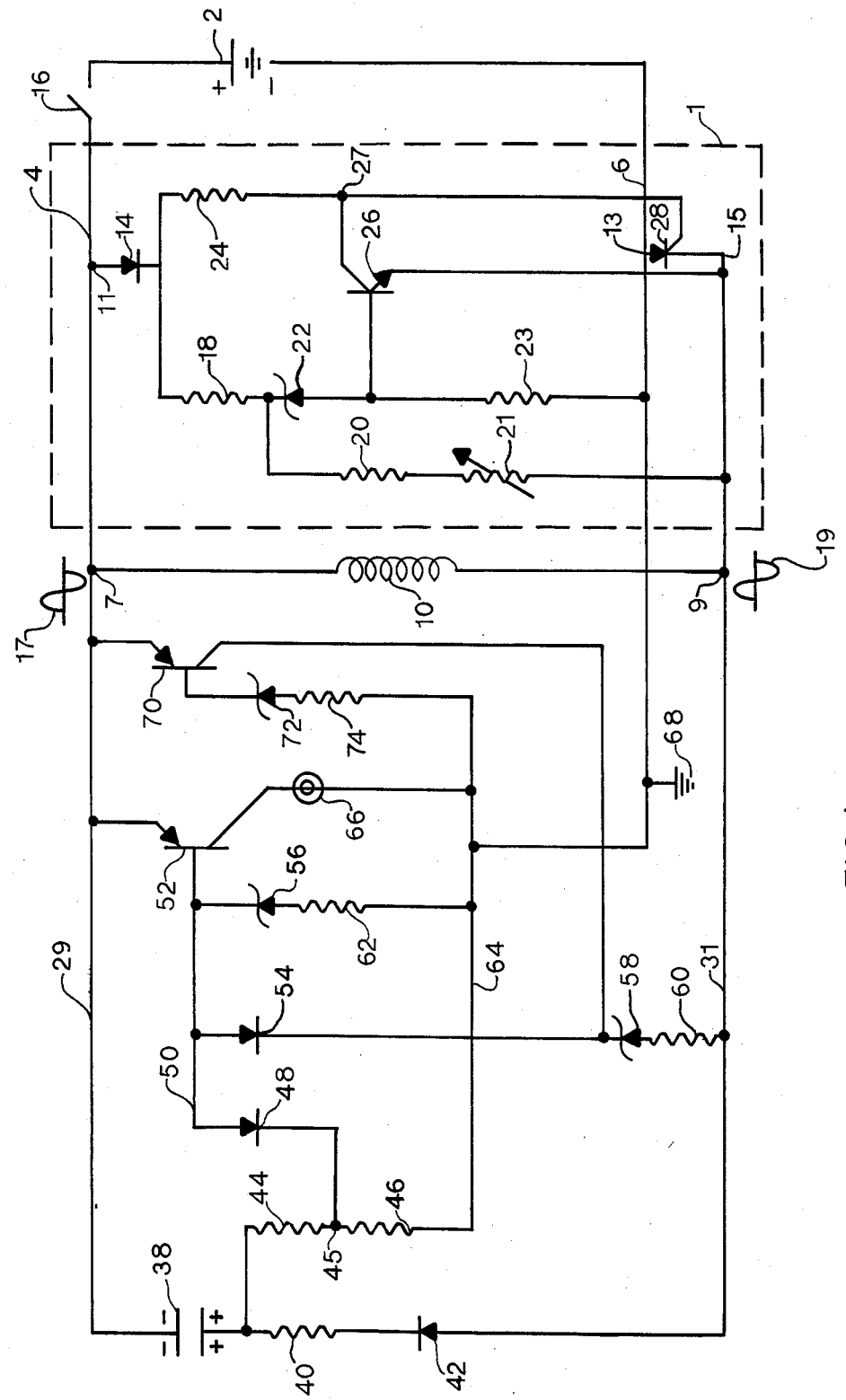

United States Patent [19]

Piteo

[11] Patent Number: 4,819,116
[45] Date of Patent: Apr. 4, 1989

[54] FAULT INDICATOR LIGHT CONTROL CIRCUIT

[75] Inventor: Michael J. Piteo, Enfield, Conn.

[73] Assignee: R. E. Phelon Company, Inc., East Longmeadow, Mass.

[21] Appl. No.: 238,766

[22] Filed: Aug. 31, 1988

[51] Int. Cl.[4] .............................................. H02H 9/00
[52] U.S. Cl. ........................................ 361/18; 361/90;
    307/10.1; 340/635; 340/636; 320/40; 320/48
[58] Field of Search ............................. 361/88, 90, 18;
    307/10 BP, 10 R; 340/79, 80, 85, 635, 636, 650,
    653, 660, 662, 663; 320/40, 48, 59, 39;
    323/274–276, 271

[56] References Cited

U.S. PATENT DOCUMENTS

| | | | |
|---|---|---|---|
| 4,056,765 | 11/1977 | Scheidler et al. | 307/10 R X |
| 4,220,909 | 9/1980 | Piteo | 320/39 X |
| 4,401,936 | 8/1983 | van Opijnen | 361/18 X |
| 4,593,233 | 6/1986 | Taylor et al. | 361/90 X |

Primary Examiner—Todd E. Deboer
Attorney, Agent, or Firm—Chapin, Neal & Dempsey

[57] ABSTRACT

A fault indicator light control circuit for a regulator controlled alternator/battery charging system has a first transistor connected with a light bulb in its conductive path to be turned "ON" when the transistor is conducting. Conduction of the transistor is controlled by a plurality of conductive paths connected to the base of the transistor and each path includes a Zener diode having a breakdown voltage substantially above the rated voltage of the battery. The conductive paths are connected to detect any one of a plurality of circuit operating defects, including a short in the silicon controlled rectifier (SCR) of a solid state regulator, an open SCR and a regulator failure. A capacitor is connected in the circuit to be charged by an alternator voltage having a polarity opposite that which is used to charge the battery. The capacitor voltage is used as a reference to bias the first transistor "OFF" when the system is operating normally. A second transistor includes another Zener diode connected to the base thereof and is selected to have a breakdown level substantially lower than that of the other Zener diodes used in the circuit. The second transistor is connected to bias the first transistor "OFF" immediately when the circuit is operating normally but an open circuit is detected between the regulator and the battery so that the light bulb will not be turned "ON".

5 Claims, 1 Drawing Sheet

FAULT INDICATOR LIGHT CONTROL CIRCUIT

BACKGROUND OF THE INVENTION

The present invention relates to an electronic system for controlling an indicator light to reveal to the operator the occurrence of any one of a plurality of defects in the operation of a solid-state regulator of an alternator/battery charging system.

While current and voltage indicators have been used for detecting an indicating defective operation of alternator systems, none has been a weather resistant solid-state system which can be connected to an existing alternator battery charging system of the type disclosed in my U.S. Pat. No. 4,220,909, dated Sept. 2, 1980.

In addition, I am not aware of any system for detecting and indicating a defective operation of a battery/alternator system which has had the capability of being able to detect and indicate being one of a plurality of operating defects of the system and indicate the same by illumination of a single light bulb.

The principal object of this invention is to provide an entirely solid-state fault indicator light control circuit for use with an alternator/battery charging system and a solid-state regulator.

Another object of this invention is to provide a fault indicator circuit of the above type in which two solid-state components are connected to sense the existence of any one of a plurality of operating defects and also to prevent the indicator light turning "ON" when an open circuit condition occurs with the system operating normally.

The above and other objects and advantages of this invention will be more readily apparent from a reading of the following description in conjunction with the appended drawing in which:

FIG. 1 is a schematic circuit diagram showing a fault indicator light control circuit used in conjunction with a solid-state regulator of an alternator/battery charging system.

As shown in the drawing, the indicator light control circuit embodying this invention is used in combination with an alternator/battery charging system, controlled by a solid-state regulator 1. The battery 2, such as a 12-volt battery for example, is connected from its positive terminal by lead 4, to the regulator terminal 11 and by lead 6, its negative terminal is connected to the regulator terminal 13. A permanent magnet alternator 10 has its output terminals 7 and 9 connected to the regulator terminals 11 and 15. While not shown in the drawing, the rotor of the alternator 10 may be driven by an internal combustion engine in which battery 2 provides the ignition pulses for operation of the engine. Alternator output voltages are depicted at 17 and 19 adjacent terminals 7 and 9 respectively. An indicator light control circuit is also connected to the alternator output by conductors 29 and 31.

THE REGULATOR

The regulator 1 comprises a diode 14 having its anode connected to the positive battery terminal by on/off ignition switch 16. The cathode 14 of the diode is connected to a pair of resistors 18 and 24 in parallel relationship. The resistor 18 is in series with a Zener diode 22 and resistor 23 as well as a fixed resistor 20 and variable resistor 21. The Zener diode 22 is selected to break down at approximately the rated voltage of the battery. The junction 27 of the emitter of transistor 26 and resistor 24 is connected to the control electrode or gate of the silicon controlled rectifier 28 (hereinafter referred to as "SCR").

When the battery 2 is below its rated voltage, and also the breakdown voltage of the Zener diode 22, the SCR 28 is gated "ON" by current through the diode 14 and resistor 24. With SCR 28 turned "ON", the battery 2 will be charged by positive pulses generated by the alternator 10 and the battery charging circuit includes the anode-cathode path of the SCR 28.

When the battery 2 is charged approximately to its rated voltage or slightly above, Zener 22 will break down and conduct thus turning "ON" transistor 26 which in turn will shunt current flow from the generator or alternator 10 away from the control electrode of the SCR 28, whereby the alternator output terminal 7 is connected through resistor 24 and transistor 26 to terminal 9 of the alternator. Similarly, during the negative half-cycle of the alternator, the SCR 28 will be "OPEN" or "OFF" whereby the SCR serves as a half-wave rectifier and as a consequence, the battery will only be charged by positive half-cycles of voltage generated by the alternator.

The regulator 1 is essentially the same as the Half-Wave Regulator Rectifier for Alterator disclosed in my earlier U.S. Pat. No. 4,220,909 issued Sept. 2, 1980 and assigned to the same Assignee as the present patent application.

The present invention comprises a fault indicator light control circuit in combination with an alternator and a regulator of the type disclosed in my earlier patent. The control circuit includes a defect or fault indicator lamp or light which will normally be "OFF" when the system is operating properly and will turn "ON" when any one of three different operating defects is detected by the circuit.

The circuit comprises a storage capacitor 38 connected to terminal 9 and will be charged by the alternator 10 through diode 42 and resistor 40. The diode 42 is poled to cause the capacitor to be charged by the alternator with a voltage opposite the polarity which is used to charge the battery. In this way, the capacitor serves to provide an available voltage source or reference voltage to reverse bias transistor 52 to its "OFF" condition, as will hereafter be more fully described.

A pair of resistors 44 and 46 are connected in series to the positive side of capacitor 38 and to the cathode side of a diode 48, which in turn is connected to a junction 45 between the resistors 44 and 46. The anode of diode 48 is connected by conductor 50 to the base of the transistor 52. The resistors 44 and 46 form a voltage-divider network and with the capacitor 38 charged as shown, its negative potential is connected to conductor 29 and its positive potential is connected to the voltage-divider network. The emitter of transistor 52 will see the negative voltage stored on the capacitor 38 and the base of transistor 52 will see the positive polarity provided by the voltage drop across resistor 46 which is in the discharge path of capacitor 38 connected to ground terminal 68.

The conductor 50 is also connected to the anode of diode 54 and the cathode of Zener diode 56. The cathode side of the diode 54 is connected by Zener diode 58 and resistor 60 to the junction 9 of the alternator 10, thus providing an alternating current circuit to detect an open-circuit condition in the regulator. The anode of Zener diode 56 is connected by resistor 62 and conductor 64 to the grounded end of resistor 46. The emitter of transistor 52 is connected to lead 29 and its collector to the electric light bulb 66 which provides the indicator light for the system embodying this invention. The other side of the light bulb is connected by conductor 64 to ground terminal 68.

Whenver transistor 52 is "ON" or in its conductive mode through its emitter-collector path, lamp 66 will be turned "ON" by the emitter base current, either through diode 54 or Zener diode 56. Diodes 54 and 56 provide alternate circuit paths to cause transistor 52 to be turned "ON" when any one of three different defects is detected in the operations of the system. On the other hand, diode 48 together with voltage-divider network consisting of resistors 44 and 46 and capacitor 38, serve to bias transistor 52 to its "OFF" condition when the system is operating normally.

A second transistor 70 combined with Zener diode 72 and resistor 74 connected to the base of transistor 70, serve to reverse bias transistor 52 "OFF" so that the indicator light will not be turned "ON" whenever the transistor 70 is conducting. The purpose of this alternate transistor conducting path is to prevent a false indicator light by providing means by for turning "ON" transistor 70 whenever the battery is charged to its rated value, but the SCR is open or cycled "OFF" as in normal regulator operation.

NORMAL OPERATION

Whenever the ignition switch 16 is closed and the alternator is not running, transistor 52 will be forward biased by the positive battery voltage applied to the emitter with respect to the base of transistor 52. In this condition, the transistor 52 will normally conduct through its emitter and collector electrodes and lamp 66 to the ground terminal 68 and the lamp 66 will be turned "ON". In this condition, transistor 70 will not be in its conductive mode because its emitter-collector path is connected by Zener diode 58 and resistor 60 to the terminal 9 of the alternator which is not yet generating.

When the engine (not shown) which drives the rotor of the alternator 10 is started and the battery 2 is being charged by the positive first half-cycle of the alternator voltage 17, and regulation is normal, the lamp 66 will be turned "OFF". This turn-off is accomplished by the voltage on capacitor 38 being charged by the second half-cycle of voltage 19 generated by the alternator. The capacitor 38 is charged through diode 42 and resistor 40 and the capacitor 38 is thus charged with a voltage polarity, as indicated in the drawing which, as seen by transistor 52, is opposite to the polarity of the battery 2. It has been found that a 0.68 microfarad capacitor capable of being charged to a voltage substantially greater than the battery will function effectively for this purpose. As a result, transistor 52 will be reversed biased to a "OFF" condition by a negative emitter voltage and positive base voltage. The base voltage is detected by diode 48 which is connected to the base of transistor 52 and the mid-point of the voltage divider formed by resistors 44 and 46. With transistor 52 thus rendered non-conductive, lamp 66 will be turned "OFF, thereby indicating normal alternator and regulator operation.

REGULATOR FAULT

If for any reason, the charging of the battery 2 is not being properly regulated, the fault detecting circuit embodying this invention will sense the defect and turn "ON" the lamp 66. When the system is thus out of regulation, the voltage of battery 2 will exceed its rated or regulated voltage, and the breakdown voltage of Zener diode 56, which may be approximately 15 volts when the system is used with a 12-volt battery. The transistor 52 will be thus turned "ON" by the positive battery voltage on the emitter of transistor 52 and a direct current path is completed through the base of transistor 52, Zener diode 56, resistor 62 to ground terminal 68. This will turn "ON" the transistor 52 whereby the lamp circuit will be completed to ground terminal 68 and the lamp 66 will turn "ON" indicating a problem with the system.

SHORTED SCR IN REGULATOR

Another problem which the indicator circuit is capable of detecting is one in which the SCR 28 is shorted so that the battery charging path is not being regulated or opened and closed by the SCR. This defect is but a variation of the result just described above and my detecting circuit would respond in an identical manner since again, the battery voltage will be charged to a level which exceeds the breakdown voltage of Zener diode 56. As a result, as described above, transistor 52 will be turned "ON" and cause lamp 66 to be lighted.

OPEN SCR IN REGULATOR

Yet another defect of the regulator which is capable of being detected by the system embodying this invention, is one in which the SCR 28 remains in its non-conducting, "OFF" or "OPEN" condition. This means, of course, that the battery 2 would not be receiving charging current from the alternator 10 and the battery voltage would fall below the rated voltage. When this low voltage condition occurs, means other than the battery voltage must be used to turn "ON" transistor 52 to light lamp 66. In this situation, the emitter of transistor 52 connected to terminal 7 is biased by the positive potential 17 generated by the alternator while the base of the transistor is connected to the negative potential simultaneously occurring at terminal 9 which is connected to the base of transistor 52 by diode 54, Zener diode 58 and resistor 60. This will cause transistor 52 to turn "ON" immediately and light lamp 66, again indicating a regulator defect, but without sensing the resultant lower battery voltage.

OPEN CIRCUIT IN ALTERNATOR

A further problem which the circuit embodying this invention will detect is one in which the alternator 10 is open-circuited whereby it is not charging the battery. This is, in effect, the same type of condition as occurs when the ignition switch 16 is "ON" but the engine and thus the alternator is not yet running. As heretofore described, in this condition, the battery voltage will forward bias transistor 52 by a positive voltage on the emitter and a negative polarity at the base. The circuit being completed by diode 48 and resistor 46 to ground 68 will cause transistor 52 to be turned "ON" conducting along the emitter-collective path to cause the lamp 66 to be lighted.

FALSE INDICATOR LIGHT PREVENTION

In order to prevent the occurrence of a false indicator light, means is also provided in the system embodying this invention to prevent illumination of light 66 when the regulator is operating normally and the SCR is cut "OFF" or "OPEN" as occurs whenever the battery voltage reaches its rated level and transistor 26 conducts to cut "OFF" SCR 28. As discussed above, the SCR's "OPEN" condition is indicated as a fault and utilizes diode 54, Zener diode 58 and resistor 60 to turn "ON" transistor 52. Where no fault exists as in normal opening of the SCR, the battery would be charged approximately to its rated value of 12-volts but transistor 70 is connected to bias "OFF" transistor 52, lest there be a false indicator light when one is not, in fact, called for. This shut-off means comprises transistor 70, a 13-volt Zener diode 72, resistor 74 and diode 54. With normal regulation, when the SCR 28 is "OPEN", the battery voltage, as mentioned above, would be at or near its rated voltage. Thus, Zener diode 72 is selected to break down at 13-volt, which is a substantially lower voltage level than the breakdown level of either Zener diode 56 or Zener diode 58 in the base circuits of transistor 52. As a result, transistor 70 will be turned "ON" at 13-volt and conduct through Zener diode 72 and resistor 74 connected to ground terminal 68. This causes conduction through the emitter, base and collector of transistor 70 which places a back bias at diode 54 to prevent transistor 52 from turning "ON". In effect, when transistor 70 is conducting, both the emitter and the base of transistor 52 are baised to approximately the same potential by transistor 70 and transistor 52 will be held "OFF". Should there be a real open circuit, however, evidencing defective operation, the battery voltage will quickly drop below the 13-volt breakdown level and Zener diode 72 and transistor 70 will be cut "OFF", whereby full control of the system will be transferred to transistor 52.

Having thus described by invention, what is claimed is:

1. Fault indicator light control circuit for use in combination with a voltage regulator having a silicon-controlled rectifier (SCR) for an alternator/battery charging system, comprising means for connecting the circuit to sense the operation of the alternator, the regulator and the battery voltage, the battery being charged by alternator pulses of one polarity, a capacitor connected to be charged by alternator pulses of opposite polarity to that which charges the battery to establish a reference voltage, a first transistor having its emitter-collector conductive path connected across the terminals of said battery and its base emitter electrodes connected across the capacitor to bias said transistor to its non-conductive state, a light bulb in series with the collector of said transistor to be turned "ON" when the transistor is in its conductive mode, a plurality of conductive paths connected to the base of said transistor and including voltage responsive means to render said transistor conductive and thereby turn "ON" said light bulb, said voltage responsive means being connected to sense any of a plurality of circuit operating defects including a short in said SCR, an open SCR and regulator failure whereby any such operating failure will be indicated by illumination of said light bulb.

2. Fault indicator light control circuit as set forth in claim 1, in which said circuit includes a second transistor connected to bias "OFF" the first transistor when the battery is being charged to approximately its rated voltage and said SCR cycles open as in its normal regulating function.

3. Fault indicator light control circuit as set forth in claim 2, in which said voltage responsive means comprises first and second Zener diodes having a voltage breakdown levels substantially above the rated battery voltage and in which a third zener diode is connected to a base of the second transistor, the third Zener diode having a voltage breakdown level substantially lower than the first and second Zener diodes and which closely approximates the rated battery voltage whereby the second transistor will be turned "ON" when the circuit is operating normally and the first transistor will turn "ON" at a substantially higher voltage when there is an operating failure in the system detected by said circuit.

4. Fault indicator light control circuit as set forth in claim 3, which includes a charging diode, poled to charge the capacitor to a said opposite polarity, said capacitor having a capacitance value for storage of voltage greater than the battery voltage whereby the capacitor serves as a dominant voltage source to reverse bias said first transistor despite the existence of the battery voltage.

5. Fault indicator light control circuit as set forth in claim 4, in which one of the plurality of conductive paths connected to the base of said first transistor includes said second Zener diode which connects the base of the first transistor to the side of the alternator opposite the side of the alternator to which its emitter is connected, thus providing an alternating current path from one to the other side of the alternator when the regulator has an open circuit failure and the battery is not being charged.

* * * * *